United States Patent [19]

Osman

[11] 4,173,544
[45] Nov. 6, 1979

[54] NOVEL ALKYLSUBSTITUTED N-BENZYLIDENEANILINES AND LIQUID CRYSTAL COMPOSITIONS CONTAINING SAME

[75] Inventor: Maged A. Osman, Zürich, Switzerland

[73] Assignee: BBC Brown Boveri & Company Limited, Baden, Switzerland

[21] Appl. No.: 750,646

[22] Filed: Dec. 15, 1976

[30] Foreign Application Priority Data

Dec. 19, 1975 [DE] Fed. Rep. of Germany ....... 2557267

[51] Int. Cl.² ............................ C09K 3/34; G02F 1/13; C07C 119/00
[52] U.S. Cl. .................................. 252/299; 252/408; 260/566 R; 260/566 F; 350/350
[58] Field of Search ................. 252/299, 408; 350/160 LC, 350; 260/566 F, 566 R

[56] References Cited

U.S. PATENT DOCUMENTS

| | | | |
|---|---|---|---|
| 3,675,987 | 7/1972 | Rafuse | 350/160 LC |
| 3,690,745 | 9/1972 | Jones et al. | 350/160 R |
| 3,756,694 | 9/1973 | Soree et al. | 252/408 |
| 3,815,972 | 6/1974 | Hsieh | 252/408 |
| 3,826,757 | 7/1974 | Wong | 252/408 |
| 3,838,059 | 9/1974 | Wong | 252/299 |
| 3,872,140 | 3/1975 | Klanderman et al. | 252/408 |
| 3,960,749 | 6/1976 | Fergason | 252/299 |
| 3,960,752 | 6/1976 | Klanderman et al. | 252/299 |
| 3,965,029 | 6/1976 | Arora | 252/299 |
| 3,965,030 | 6/1976 | Jones et al. | 252/299 |
| 4,082,686 | 4/1978 | Tatsuta et al. | 252/299 |

FOREIGN PATENT DOCUMENTS

| | | | |
|---|---|---|---|
| 2351684 | 4/1974 | Fed. Rep. of Germany | 252/299 |
| 2535125 | 2/1976 | Fed. Rep. of Germany | 252/299 |
| 49-29290 | 3/1974 | Japan | 252/299 |
| 41-59077 | 5/1976 | Japan | 252/299 |

OTHER PUBLICATIONS

Dave; J. S. et al., J. Chem. Soc., part 4, pp. 4305–4309 (1955).
Oh, Chan. S., Mol. Cryst. Liq. Cryst., vol. 42, pp. 1–14 (1977).

Primary Examiner—Benjamin R. Padgett
Assistant Examiner—T. S. Gron
Attorney, Agent, or Firm—Oblon, Fisher, Spivak, McClelland & Maier

[57] ABSTRACT

Novel alkylsubstituted N-benzylideneanilines of formula

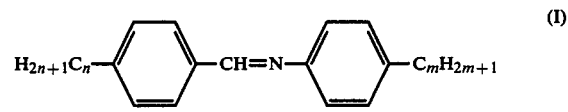

in which n and m each represent zero or integers of from 1 to 8 and wherein the sum of n plus m is at least 6; the novel formula (I) compounds are suitable for use as dielectric component of electro-optic LC-display devices. Liquid crystal compositions containing the novel compounds for use as dielectric phase in nematic or smectic electro-optic LC-display devices and an improved method for producing 4-alkylsubstituted and 4,4'-dialkylsubstituted N-benzylideneanilines including the novel formula (I) compounds by condensation of the corresponding aldehydes and anilines in bulk.

4 Claims, No Drawings

NOVEL ALKYLSUBSTITUTED N-BENZYLIDENEANILINES AND LIQUID CRYSTAL COMPOSITIONS CONTAINING SAME

BACKGROUND OF THE INVENTION

The present invention relates to compounds and compositions for use as liquid crystal phase in electro-optic display devices and, specifically, to certain novel alkylsubstituted N-benzylideneanilines as well as to liquid crystal compositions containing such novel compounds, and to improved methods of producing alkylsubstituted N-benzylideneanilines.

More than 7000 compounds are known to be capable of existing in a liquid crystalline state, i.e. exhibiting one or more mesomorphic states or mesophases over a temperature range near, or adjacent to, their melting point temperature. In their liquid crystalline mesophase such compounds—generally referred to as "liquid crystals" or "LC" for short—behave neither as liquids proper nor as crystalline solids because while behaving as liquids they show a molecular alignment or orientation, e.g. as evidenced by X-ray diffraction, of the type that is characteristic of crystalline solids. Texture observations of various liquid crystals under a polarizing microscope indicate the existence of different types of mesophases, i.e. the so-called nematic and smectic mesophase, and sub-types thereof are known and are designated by capital letters, for example as smectic phases B, E and G.

As is commonly known, such liquid crystals are used for electro-optic display devices—commonly called "LC-displays"—in order to distinguish them from other types of electro-optic devices, for example those employing gas-discharge devices or semiconducting solids including light-emitting diode displays and the like. The term "display" is used to refer to the capacity of such devices to show or display predetermined symbols including alphanumerical signs. In general, the electro-optic display device of the type operating with liquid crystals comprises a cell including electrodes, a liquid crystal mass or composition as a dielectric phase or component between the electrodes and electronic means to selectively activate specific electrode areas. Such LC-displays are well known in the art and are produced commercially in increasing amounts for such purposes as digital wrist watches and the like.

For commercial production of LC-displays only a limited number of organic mesophase or LC compounds can be used. This is due to the fact that most liquid crystal compounds are solids at room temperature and/or exhibit a very narrow operational temperature range. One of the few liquid crystal compounds known in the art has been described by G. Gray, M. Harrison and I. Nash in Electronic Letters, Vol. 9, No. 6, page 130, 1973 and is 4-cyano-4'-n-hexylbiphenyl melting at 13.5° C. Virtually, any LC-display for operation at normal ambient temperatures, i.e. the general range of from about −20° C. to about +70° C. and including the room temperature range of from about 15° C. to about 25° C., includes a composite mixture of LC-compounds that are solid at room temperature either as a mixture of one or more LC-compounds or, preferably, as a mixture of one or more normally solid LC-compounds with one or more other compounds that are not liquid crystals proper but have a chemical structure similar to that of the LC-compounds and thus are capable of forming eutectic multicomponent mixtures with LC-compounds. Most LC-displays for commercial purposes and notably the so-called "twisted nematic displays" (cf. Appl. Phys., 1975, pages 101–106) employing effects discovered by well known authors, such as J. H. Heilmeier, L. A. Zanoni, M. Schadt and W. Helfrich (cf. Appl. Phys. Letters No. 13, 1968, page 91; and Appl. Phys. Letters No. 18, 1971, page 127) use LC-compositions in the nematic mesophase and the art is replete with specific nematic multicomponent liquid crystal compositions, German Patent application DT-OS 2,344,732 being recited here as a representative example only.

Research efforts with the aim to find additional low-melting LC-compounds that have a relatively simple chemical structure, and to develop improved LC-compositions are being continued, however, for the following reasons: various and, to some extent, contradictory requirements have to be met with regard to clearing point temperature, nominal melting point temperature, operative temperature range, operating voltage, chemical stability of components and physical stability of composition so that more than three different constituents will have to be used for an LC-composition that meets such requirements. Accordingly, the resulting composition is a fairly complex mixture and this complexity tends to increase the danger of chromatography-type separation phenomena upon introduction of the LC-composition into an LC-display cell. With such complex mixtures, the desired eutectic composition is not well defined and can be fully achieved in exceptional cases only. Maintaining a eutectic state, however, is essential when using such ternary, quaternary or even more complex compositions as this tends to be of critical importance for a reliable continuous operation of LC-displays. When using prior art non-eutectic compositions, an intermediate cooling of the cell below the lower limit of the operable temperature range results in a separation that tends to be practically irreversible so that the LC-display will cease to be operative. Specifically, when a component of the composition crystallizes upon cooling in the sense of becoming solid, the properties of the composition will be changed in a virtually irreversible manner as regeneration of the composition upon subsequent warming-up of the LC-display to a temperature within the normally operative temperature of the cell cannot be expected because of the minute dimensions of the cell space that includes the LC-composition so that a return into the original state is precluded for all practical purposes.

Accordingly, there is a continued substantial demand for new specific LC-compounds suitable per se or as a constituent of binary and not more than ternary composite LC-mixtures or compositions that have improved characteristics for use in standard LC-display devices.

The use of the broad general class of compounds of formula

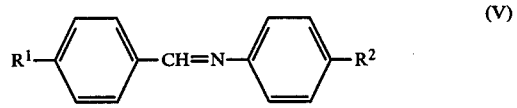

(V)

wherein $R^1$ and $R^2$ are selected from the group of alkyl, alkoxy and alkylcarboxy groups comprising of from 1 to 7 C-atoms as an additive for specific LC-compositions has been suggested in some publications, e.g. German Patent Specification DT-OS 2,316,864, without, however, reciting a single specific compound in which both $R^1$ and $R^2$ are alkyl groups.

All specific known compounds of this type where both $R^1$ and $R^2$ are alkyl groups (methyl/methyl and ethyl/methyl) are known to be isotropic, i.e. having no mesophase as explained above, and have high melting points. Accordingly, such compounds are not suitable at all for LC-compositions. One other specific known compound (formula (V) wherein $R^1$ is the methyl group and $R^2$ is the n-butyl group) is isotropic as well but has been suggested for use as an additive in LC-compositions to lower the melting point of the entire mixture (cf. German Patent applications DT-OS 2,214,967 and DT-OS 2,307,148).

Summarizing the art it can be said that p,p'-dialkyl-benzylideneanilines as a class did not seem to offer particular advantages for the art of LC-display devices.

SUMMARY OF THE INVENTION

Surprisingly, I have found that in contrast to what would have to be expected in view of the art a group of novel specific compounds within the broad class of alkylsubstituted N-benzylideneanilines provides for substantial improvements in the LC art if the p-alkyl substituents or the p,p'-dialkyl substituents of such compound meet certain criteria explained in more detail below.

Accordingly, it is a main object of this invention to provide a group of specific novel compounds suitable for an improved liquid crystal phase of LC-display devices.

Another main object of this invention is an improved liquid crystal composition suitable for use in LC-display devices of the nematic or smectic type.

A further object of this invention is an improved method for producing alkylsubstituted N-benzylideneanilines.

Further objects will become apparent as the specification proceeds.

BRIEF DESCRIPTION OF PREFERRED EMBODIMENTS

According to a first general embodiment this invention provides for novel compounds of formula

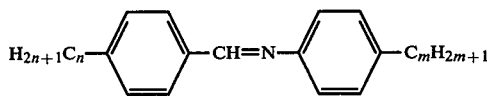

in which n and m each represent a numerical value selected from the group consisting of zero and integers from 1 to 8 inclusive and wherein the sum of n plus m is at least 6.

Preferred compounds within the ambit of formula (I) are those where the sum of n plus m is not more than about 13 with an upper limit of said sum of n plus m of not more than about 10 being even more preferred.

Furthermore, preferred formula (I) compounds are those where n is unequal 3 if m is 3, and those compounds where n is an integer of from 5 to about 8 when m is 2.

The p-alkyl substituent or both the p-substituent and the p'-substituent of formula (I) compound generally is a straight chain or a substantially straight chain alkyl radical.

In general, variations of n and m in formula (I) according to the following table I have been found to yield preferred compounds according to the invention.

TABLE I

| Preferred compounds of formula (I) | |
|---|---|
| n | m |
| 1 | 5–8 |
| 2 | 4–8 |
| 3 | 3–8 |
| 4 | 2–7 |
| 5 | 1–7 |
| 6 | 0–7 |
| 7 | 0–5 |

Within the group of compounds defined by formula (I) in general and by Table I in specific, a preferred subgroup consists of those compounds where the numerical value of m is greater than that of n.

According to a second general embodiment the invention provides for a novel and improved liquid crystal composition suitable for electro-optic LC-display devices and said composition consisting of a mixture of at least one compound of formula

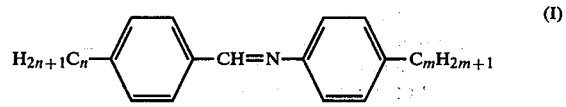

in which n and m each represent a numerical value selected from the group consisting of zero and integers of from 1 to 8 inclusive and wherein the sum of n plus m is at least 6 and of at least one other dielectric organic compound that is suitable for use in LC-compositions and may, or may not, be mesomorphic.

From the large number of prior art compounds suitable for use in such inventive LC-compositions in admixture with one or more formula (I) compound(s), a preferred group is defined by formula (II)

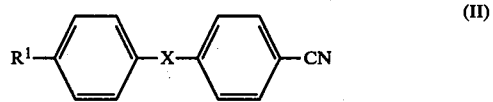

in which R' is selected from the group consisting of alkyl, alkoxy and alkylcarboxy groups having an alkyl moiety comprising from 1 to 7 C-atoms, preferably in a substantially straight chain, and X is a bivalent group of the formulae —CH=N— or

or a direct covalent single bond between the two aromatic nuclei.

The selection of one or more of the novel formula (I) compounds for LC-compositions in accordance with the second embodiment of the invention will, in general, be governed by the criteria enumerated above plus the specific end-use requirements of the LC-display device that is to incorporate such composition.

According to a third general embodiment, the invention provides for an improvement of prior art electro-optic display devices of the type comprising a cell, an electrode means and a dielectric component enclosed in said cell between said electrode means, said dielectric component being a liquid crystal composition, the improvement consisting of including in said nematic liquid crystal composition at least one compound of formula (I) as defined above.

It should be noted that LC-display devices of the commonly used nematic type as set forth in the above mentioned publications, as well as of the more recent smectic type (cf. Appl. Phys. Letters No. 22, 1973, page 111; Electr. Lett. 11/4, 1975) can be improved by using suitable inventive compounds of formula (I).

According to a forth embodiment the invention provides for an improvement of a prior art method employed in the synthesis of N-benzylideneanilines. In the course of the investigations leading to the present invention it was found that the condensation of benzaldehydes and anilines to form such N-benzylideneanilines provides for improved yields and other advantages if the condensation is carried out in bulk, i.e. as distinguished from prior art condensation in a solvent. Both the novel formula (I) compounds as well as other N-benzylideneanilines or Schiff bases including prior art compounds of that type can be obtained according to this method aspect of the invention which provides an improvement in a method for producing compounds of formula

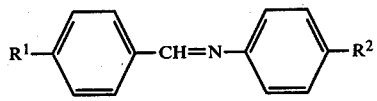

(III)

in which $R^1$ and $R^2$ are selected each from the group consisting of hydrogen and alkyl radicals including from 1 to about 10 C-atoms, at least one of said groups $R^1$ and $R^2$ being an alkyl group, by condensation of a benzaldehyde compound of formula

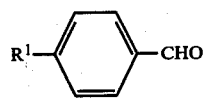

(IV)

in which $R^1$ is as defined above, with an aniline compound of formula

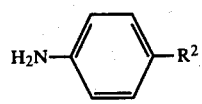

(VI)

in which $R^2$ is as defined above; the improvement consisting of carrying out said condensation of said benzaldehyde compound and said aniline compound in substantial absence of a solvent.

This method embodiment of the invention is particularly preferred for producing the formula (I) compounds and, in that instance, $R^1$ and $R^2$ in formulae (III), (IV) and (VI), respectively, have the significance indicated above for $C_nH_{2n+1}$ and $C_mH_{2m+1}$.

DESCRIPTION OF THE PREFERRED EMBODIMENTS

In general, inventive compounds of formula (I) can be designated as p-alkylsubstituted and p,p'-dialkylsubstituted N-benzylideneaniline compounds (p and p' indicating the para- or 4- and 4'-positions with regard to the methineazo linkage —CH=N— in which any alkyl group is a generally straight chain, the n-alkyls of from 1 to about 7 carbon atoms being most preferred. Particularly preferred compounds are the N-(4-n-alkylbenzylidene)-4'-n-alkylanilines of the group in which both the 4-alkyl as well as the 4'-alkyl constitute a normal, i.e. straight chain alkyl moiety of from 1 to 8 C-atoms with the proviso (a) that the compound includes a total of at least 6 C-atoms in both alkyl groups, (b) that the alkyls do not both have an alkyl chain length of three, and (c) that the 4-alkyl includes of from 5 to 8 C-atoms if the 4'-alkyl consists of 2 C-atoms.

Specific examples for n-alkyl radicals suitable as 4- and/or 4'-alkyl groups in the novel formula (I) compound include methyl, ethyl, n-propyl, n-butyl, n-pentyl, n-hexyl, n-heptyl and n-octyl, but some minor amount of branching of the alkyl groups would seem to be admissible.

Formula (I) compounds have been found to be capable of existing in one or more mesomorphic states, or mesophases including nematic and/or smectic phases. A further advantage for LC uses is the low or even extremely low melting point (e.g. extending to below about $-90°$ C.) of the preferred compounds. Some formula (I) compounds are enantiotropic liquid crystals; others are monotropic in the sense that their clarification point can be observed in an undercooled state only.

In Table II below a summary of preferred inventive compounds is given. The significance of the symbols and values in Table II is as follows:

n, m indicate the number of carbon atoms in the straight chain alkyl groups in the respective 4- and/or 4'-position of formula (I);

Mp is the melting point in degree Centigrade;

S indicates the smectic phase;

N indicates the nematic phase;

I indicates isotropy;

$< -90$ means that no melting point was found at minus 90° C.;

temperature values in brackets indicate that the transistion point was found in the undercooled state.

TABLE II

| Formula (I) | | Mp | Transition Points (°C.) | | |
|---|---|---|---|---|---|
| n | m | (°C.) | S → N | S → I | N → I |
| 1 | 5 | 33.2 | | | (19.1) |
| 1 | 6 | 24.6 | | | (8.5) |
| 2 | 4 | 6.3 | | | (−8.1) |
| 2 | 5 | 8.2 | | | 14.2 |
| 2 | 6 | 9.7 | | | (5.8) |
| 3 | 4 | 13.6 | | | 18.9 |
| 3 | 5 | 27.1 | | | 37.0 |
| 3 | 6 | 0 | 2 | | 28.9 |
| 4 | 3 | 15.8 | | | 18.8 |
| 4 | 4 | 17.0 | | | (10.4) |
| 4 | 5 | 14.4 | (3.5) | | 26.7 |
| 4 | 6 | 1 | 12.5 | | 21.2 |
| 5 | 1 | 48.1 | | | (25.7) |
| 5 | 2 | −8 | 10 | | 18.3 |
| 5 | 3 | 23 | (19.5) | | 38.0 |
| 5 | 4 | 0 | 24 | | 30.1 |
| 5 | 5 | 34.5 | (32) | | 43.7 |
| 5 | 6 | −2 | 36.2 | | 38.2 |
| 6 | 0 | 15.3 | | (−19) | |
| 6 | 1 | −6 | 14.5 | | 18 |
| 6 | 2 | <−90 | | 20.7 | |
| 6 | 3 | <−90 | 29.5 | | 31.5 |
| 6 | 4 | <−90 | | 30.9 | |
| 6 | 5 | 4 | | 38.7 | |
| 6 | 6 | 10 | | 40.2 | |
| 7 | 0 | 9.6 | | (−11.1) | |
| 7 | 1 | 18 | 27.5 | | 33.2 |
| 7 | 2 | 24 | | 32.3 | |

TABLE II-continued

| Formula (I) | | Mp | Transition Points (°C.) | | |
|---|---|---|---|---|---|
| n | m | (°C.) | S → N | S → I | N → I |
| 7 | 3 | 11 | | 44.9 | |
| 7 | 4 | 90 | | 43.7 | |

In connection with Table II it is to be noted that the compounds that did not have a melting point at −90° C., i.e. remaining in liquid form even at that temperature, either would seem to have an even lower melting point or may exist at such low temperatures in a metastable state in which the compound is, or can be, undercooled.

As is apparent from the above Table, both the low-melting apscet as well as the mesomorphic behaviour makes such novel formula (I) compounds eminently suitable for LC uses, either per se or in admixture with other compounds. In addition, formula (I) compounds provide for low-viscosity melts and this aspect in itself is an advantage in the LC art and/or can be used advantageously for lowering the viscosity of compositions that include such compounds. Those compounds of Table II that have a smectic but no nematic mesophase can be used as dielectric component, or part thereof, in smectic-type LC-display devices as set forth above. Further, such compounds are generally suitable for use as additives to prior art LC compositions or compounds with the advantageous effect of lowering viscosities and/or melting points of such compositions.

It should be noted here that selection of suitable prior art compounds for producing LC compositions is a well established art. Firstly, representative publications exist that indicate known LC compounds, many of which are available commercially. As an example reference is made to the Eastman Organic Chemicals Catalogue No. 46, pages 447–449, the Eastman Organic Chemical Bulletin, Vol. 45, Nos. 1 and 2 (1973) and the monography by D. Demus, H. Demus and H. Zaschke, "Flüssige Kristalle in Tabellen", published by VEB Deutscher Verlag fur Grundstoffindustrie (Leipzig 1974), while the preferred prior art LC compounds of formula (V) are disclosed in German Patent applications DT-OS 2,306,738 and DT-OS 2,306,739, all of said publications being incorporated into this specification by way of reference.

Secondly, with regard to the art of making LC compositions for various end uses, numerous standard publications are available for proper selection of constituents and amounts thereof by the expert in the art of making LC compositions. As examples of such publications for use herein, reference is made to the monography by E. B. Priestley, P. J. Wojtowitz and P. Sheng, "Introduction to Liquid Crystals" (1976), and to the work by E. L. Williams, "Liquid Crystals for Electronic Devices", published in Chem. Technology Review, Vol. 46 (1975), and these publications are also incorporated into this specification by reference.

When using the novel formula (I) compounds in admixture with prior art LC compounds for preparing the LC composition that constitute the second embodiment of the invention, optimum amounts and proportions will be easily found by the expert on the basis of established criteria in the art. Generally, formula (I) compounds can be used in amounts of from about 1 to about 99% by weight, depending upon the degree of complexity and characteristics of the final LC composition and the specific properties of the formula (I) compounds. Experimental evidence available at present indicates that neither a lower nor an upper limit of such amounts appears to be critical. Advantageous effects have been achieved with amounts of formula (I) compounds in the range of from about 5 to about 40% by weight of the composition, with a range of from about 10% to about 30% being a typical preferred range.

In this connection, however, as well as with regard to the structure of suitable LC cells no particular parameter is believed to be critical within the well established knowledge of the expert.

In an analogous manner, suitable methods for preparing the novel formula (I) compounds are known per se in the art of chemical synthesis. A typical prior art method for preparing N-benzylideneaniline and its derivatives is based upon the condensation of benzaldehyde and aniline so as to form the methineazo linkage between the benzene nucleus of the aldehyde and the benzene nucleus of aniline. Introduction of the alkyl moieties in 4- and/or 4'-position with regard to the methineazo or azomethine linkage, respectively, can be effected prior or after condensation by standard alkylation techniques.

As indicated above, it has been found that the prior art condensation of benzaldehydes, preferably those benzaldehyde compounds according to the above indicated formula (IV) with aniline, preferably the aniline compounds of the above indicated formula (VI), will yield N-benzylideneaniline, preferably the 4- and 4'-alkylsubstituted N-benzylideneaniline compounds of the above indicated formula (III), at a faster rate of reaction and in higher yields when the condensation is effected in bulk, i.e. in substantial absence of a solvent other than the reactants. This inventive method of condensation may occur spontaneously even at room temperature (15°–25° C.) and in the absence of a catalyst. At somewhat elevated temperatures, e.g. up to 100° C. and typically in the range of from about 50° C. to about 90° C., substantially quantitative yields of formula (III) compounds can be obtained. Preferably, the condensation is effected in substantial absence of gaseous oxygen, e.g. under an inert gas, such as nitrogen, and at reduced pressures, e.g. at an absolute pressure of about 20 to 40 mm Hg. Simple purification methods such as distillation under vacuum are sufficient to obtain the target compounds in LC grade qualities. This method is particularly preferred for producing formula (I) compounds.

Starting substances can be obtained commercially or produced by well known methods. For example, 4-n-alkylbenzaldehydes of formula (IV) can be obtained by a method reported by A. Rieche et al (Chem. Ber. Vol. 93 (1960) 88). A preferred method for obtaining pure p-alkylbenzaldehydes suitable as a starting material here is disclosed in German Patent application DT-OS 2,443,618 relating to a condensation for producing the corresponding 4'-nitrilo compounds.

Suitable 4-n-alkylanilines of formula (VI) can be obtained by acylation of acetanilide in the presence of a catalyst, e.g. aluminum chloride, hydrogenation of the intermediate thus obtained and hydrolysis of the 4-n-alkyl acetanilide so as to yield the amine. Reference is made to the publications by F. Kunkel (Chem. Ber. Vol. 33 (1900) page 2641) and R. Steinstrasser et al (Z. Naturforsch. Vol. 26b (1971), page 577).

Specific non-restrictive examples will be given below to illustrate the invention. Parts and percentages are by weight.

EXAMPLE I

(a) Preparation of 4-acetaminophenyl-n-alkylketon

AlCl$_3$ (sublimed and powdered) was added portionwise to a stirred suspension of 13.5 g acetanilide (0.1 M) in 150 ml CS$_2$ or trichloroethylene so that the reaction temperature did not exceed 30° C. The acid chloride was then added through a dropping funnel under stirring and the mixture heated to reflux. Upon termination of the reaction the dark brown solution obtained was poured on ice (CS$_2$ was separated when used as a solvent), extracted with CHCl$_3$ and the organic phase was washed neutral and dried over Na$_2$SO$_4$. The solvent was destilled off to get the crystalline product. This was dissolved in ethanol and treated with active charcoal. A small amount of ether was added to the crystalline product to form a slurry which was filtered to get the pure ketone. The filtrate contained the unreacted acetanilide together with a small amount of the product. The product was recrystallized from ethanol.

(b) Preparation of the 4-n-alkylacetanilide 0.2 ml of 2 N H$_2$SO$_4$ were added to a solution of 10 g of the product of step (a), i.e. the 4-acetaminophenyl-n-alkylketone, in ethanol and the solution hydrogenated over 1 g 10% Pd/C. The reaction was completed in 90 minutes. Products obtained from CS$_2$ poisoned the catalyst when contaminated with traces of sulphur compounds and were therefore purified before hydrogenolysis.

(c) Preparation of the 4-n-alkylaniline 10 g 4-n-alkylacetanilide obtained according to (b) were added to 100 ml of aqueous 20% HCl and the mixture heated to reflux for 1 hour. The solution was cooled, neutralized and the product extracted with ether. The solvent was stripped off and the product destilled under reduced pressure.

(d) Preparation of the N-(4-n-alkylbenzilidene)-4'-n-alkylaniline

Equivalent molar amounts of 4-n-alkylbenzaldehyde obtained as indicated above and 4-n-alkylaniline obtained in step (c) were heated at 50°-90° C. under reduced nitrogen pressure (20-40 mm Hg) for 1 hour. The product was purified by vacuum destillation.

In this general manner, the compounds of formula (I) set forth in Table II above were obtained by using the specific alkyl required. In each case, analytical data confirmed the general formula.

EXAMPLE II

Preparation of N-(4-n-ethylbenzylidene)-4'-n-butylaniline

Equivalent amounts (0.05 M) of p-ethylbenzaldehyde (6.7 g) and p-n-butylaniline (7.45 g) were stirred under a nitrogen atmosphere at a reduced pressure (20-40 mm Hg) and heated to 60° C. within a period of 20 minutes. Substantially instant condensation of the reactants was observed. After keeping the reaction mass at 60° C. for an hour, the product obtained was destilled at 110° C./0.05 Torr. The yield was 97%.

EXAMPLE III

Preparation of N-(4-n-butylbenzylidene)-4'-n-butylaniline

According to the procedure of Example II, 0.02 M of p-n-butylbenzaldehyde (3.24 g) were reacted with an equivalent amount of p-n-butylaniline (3.0 g). The mixture was heated to 90° C. within a period of 20 minutes and the reaction mass was kept at that temperature for an additional period of 60 minutes. The reaction was slightly exothermic. The crude product obtained as an oil was purified by destillation at 115° C./0.01 Torr to produce the target compound. The yield was 98%.

EXAMPLE IV

Preparation of N-(4-n-hexylbenzylidene)-4'-n-ethylaniline 3.8 g of p-n-hexylbenzaldehyde (0.02 M) were reacted with 2.4 g of p-ethylaniline according to the general procedure of Example II. The mixture of the reactants was heated to 80° C. within 20 minutes and kept at that temperature for another 60 minutes. The reaction was slightly exothermic. The target product was obtained by destillation at 150° C./0.05 Torr of the crude reaction product in a yield of 93%.

EXAMPLE V

A series of binary LC compositions was prepared from the following constituents in the amounts given below.

(K): Prior art compound of formula (II) (R' is n-hexyloxy, X is —CH=N—);
(L): prior art compound of formula (II) (R' is n-hexyl, X is —CH=N—);
(U): novel compound of formula (I) (n is 3, m is 4);
(V): novel compound of formula (I) (n is 5, m is 2);
(W): novel compound of formula (I) (n is 7, m is 1).

The binary compositions made and identified in Table III below formed nematic phases. For field effect LC-displays employing a nematic type LC composition, the operative temperature range is defined by $T_n$ (the temperature at which the composition becomes nematic) as a lower limit and by $T_c$ (the temperature at which the melt becomes isotropic, i.e. the clarification temperature) as an upper limit. The specific $T_n$ and $T_c$ values (in °C.) obtained from the binary mixtures made from the above identified constituents, as well as the proportions (in % by weight) of the compositions are shown in Table III. With the exception of the composition consisting of 70% by weight of (K) and 30% by weight of (U), the $T_n$-value was the same as the melting point. The 70% K/30% U composition has an extremely low melting point of below −70° C. and the composition is smectic up to $T_n$. Numbers given in brackets are for comparative purposes. The indication "< −90" is used again to indicate that no melting point (solidification) was observed upon cooling to −90° C.

TABLE III

| Ratios of Components (%) | | | | | | |
|---|---|---|---|---|---|---|
| K | L | U | V | W | $T_n$ (°C.) | $T_c$ (°C.) |
| (100) | — | — | — | — | (55) | (101) |
| 90 | — | 10 | — | — | 45 | 93 |
| 70 | — | 30 | — | — | 27 | 76 |
| 90 | — | — | 10 | — | 43 | 91 |
| 70 | — | — | 30 | — | 22 | 75 |
| 90 | — | — | — | 10 | 45 | 90 |
| — | (100) | — | — | — | (33) | (63) |

TABLE III-continued

| Ratios of Components (%) | | | | | | |
|---|---|---|---|---|---|---|
| K | L | U | V | W | $T_n$ (°C.) | $T_c$ (°C.) |
| — | 90 | 10 | — | — | <−90 | 58 |
| — | 80 | 20 | — | — | <−90 | 53 |

In general the novel compounds of formula (I) provide for low melting dielectric components for LC-display devices and can be used both as such or as constituents of multi-component (binary, ternary, etc.) LC compositions having an operational temperature rage which is substantially extended at its lower limit, thus providing for LC-display devices that will remain operative even at very low temperatures.

Various modes of carrying out the invention are contemplated as being within the scope of the following claims, particularly pointing out and distinctly claiming the subject matter which is regarded as the invention.

ACCORDINGLY,

What I claim is:

1. In a process for producing compounds of formula

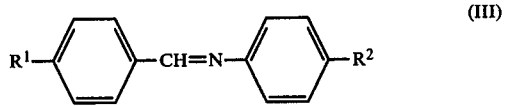

in which $R^1$ and $R^2$ are selected each from the group consisting of hydrogen and alkyl radicals including from 1 to about 10 C-atoms, at least one of said groups $R^1$ and $R^2$ being an alkyl group, by condensation of a benzaldehyde compound of formula

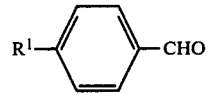

in which $R^1$ is as defined above, with an aniline compound of formula

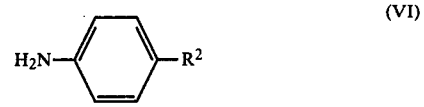

in which $R^2$ is as defined above; the improvement consisting of effecting said condensation of said benzaldehyde compound and said aniline compound in substantial absence of a solvent, at temperatures below 100° C. and in the substantial absence of oxygen.

2. A liquid crystal composition comprising 80–90% by weight of a compound of the formula (I)

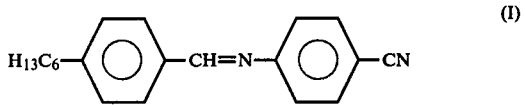

and 10–20% by weight of a compound of the formula (II)

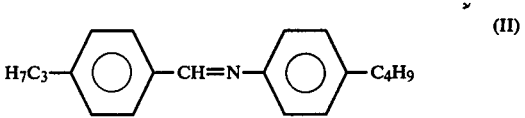

3. The composition of claim 2 which comprises 90% of said compound of formula (I) and 10% of said compound of formula (II).

4. The composition of claim 2 which comprises 80% of said compound of formula (I) and 20% of said compound of formula (II).

* * * * *